United States Patent
Nack et al.

US008697159B2

(10) Patent No.: US 8,697,159 B2
(45) Date of Patent: Apr. 15, 2014

(54) COATED FOOD PRODUCT AND METHOD OF PREPARATION

(75) Inventors: Thomas J. Nack, Hopkins, MN (US); Terry R. Harrington, Albertville, MN (US); Victor T. Huang, Maple Grove, MN (US); Anthony J. Larson, St. Paul, MN (US); Christine Nowakowski, Plymouth, MN (US); Alan A. Oppenheimer, Savage, MN (US); Noel Pollen, Hopkins, MN (US); Michael A. Staeger, Minnetonka, MN (US)

(73) Assignee: General Mills, Inc., Minneapolis, MN (US)

( * ) Notice: Subject to any disclaimer, the term of this patent is extended or adjusted under 35 U.S.C. 154(b) by 341 days.

(21) Appl. No.: 12/692,702

(22) Filed: Jan. 25, 2010

(65) Prior Publication Data

US 2011/0183046 A1    Jul. 28, 2011

(51) Int. Cl.
*A21D 13/00* (2006.01)
*A23L 1/00* (2006.01)
*A23B 7/16* (2006.01)

(52) U.S. Cl.
USPC ............................. 426/94; 426/99; 426/307

(58) Field of Classification Search
None
See application file for complete search history.

(56) References Cited

U.S. PATENT DOCUMENTS

| | | | |
|---|---|---|---|
| 202,609 A | 4/1878 | Upton | |
| 339,443 A | 4/1886 | Marean | |
| 339,444 A | 4/1886 | Markee | |
| 341,469 A | 5/1886 | Fluette | |
| 368,791 A | 8/1887 | Straughn | |
| 372,352 A | 11/1887 | Bailey | |
| 373,671 A | 11/1887 | Martin | |
| 387,785 A | 8/1888 | Hawkins | |
| 403,485 A | 5/1889 | Patton | |
| 3,830,941 A * | 8/1974 | Luft et al. | 426/309 |
| 3,840,685 A * | 10/1974 | Lyall et al. | 426/618 |
| 4,251,551 A | 2/1981 | VanHulle et al. | |
| 4,567,047 A | 1/1986 | Wilson | |
| 4,569,847 A | 2/1986 | Andrews | |
| 4,608,263 A | 8/1986 | Bergin et al. | |
| 4,844,919 A | 7/1989 | Szwerc | |
| 4,910,031 A * | 3/1990 | Budd et al. | 426/96 |
| 5,128,166 A | 7/1992 | Babines et al. | |
| 5,250,308 A | 10/1993 | Alexander et al. | |
| 5,441,753 A | 8/1995 | McGinley et al. | |
| 5,705,207 A | 1/1998 | Cook et al. | |
| 5,731,020 A | 3/1998 | Russo | |
| 5,747,080 A | 5/1998 | Lemke et al. | |
| 5,795,613 A | 8/1998 | Scharfmann et al. | |
| 6,290,999 B1 | 9/2001 | Gerrish et al. | |
| 6,303,163 B1 | 10/2001 | Wu | |
| 6,375,998 B1 | 4/2002 | Wu | |
| 6,444,240 B1 | 9/2002 | Barkalow et al. | |
| 6,475,540 B1 | 11/2002 | Howling | |
| 6,555,146 B1 | 4/2003 | Rapp et al. | |
| 6,565,900 B2 | 5/2003 | Roussel et al. | |
| 6,783,779 B2 | 8/2004 | Rapp et al. | |
| 6,821,537 B2 | 11/2004 | Wu | |
| 7,090,883 B2 | 8/2006 | Phipps | |
| 7,229,660 B2 | 6/2007 | Hudson et al. | |
| 7,294,355 B2 | 11/2007 | Roskam et al. | |
| 7,320,807 B2 | 1/2008 | Asher et al. | |
| 7,320,810 B2 | 1/2008 | Wuersch et al. | |
| 2002/0015765 A1 | 2/2002 | Wu | |
| 2002/0150654 A1 | 10/2002 | Asher et al. | |
| 2003/0003194 A1 | 1/2003 | Roussel et al. | |
| 2003/0044488 A1 | 3/2003 | Roskam et al. | |
| 2003/0099747 A1 | 5/2003 | Eini et al. | |
| 2003/0147999 A1 | 8/2003 | Mertens et al. | |
| 2004/0035858 A1 | 2/2004 | De Boer et al. | |
| 2004/0067282 A1 | 4/2004 | Karwowski et al. | |
| 2004/0067283 A1 | 4/2004 | Hudson et al. | |
| 2004/0115331 A1 | 6/2004 | Eggink et al. | |

(Continued)

FOREIGN PATENT DOCUMENTS

| | | |
|---|---|---|
| CA | 2452035 A1 | 6/2005 |
| DE | 202006013504 U1 | 2/2007 |

(Continued)

OTHER PUBLICATIONS

Elizbieta Gujska et al., 1995, "Shelf-Life Stability of Flavoured Pinto Bean (*Phaseolus vulgaris*) and Field Pea (*Pisum sativum*) Extrudes", *Polish Journal of Food and Nutrition Sciences*, vol. 4/45, No. 1, pp. 43-54.
H.A. Mansoubi et al., Nov. 8, 1999, "Comparison Among Gluten, Maltodextrin, and Soybean Oil Coatings as Flavor Carriers on Pita Chips", *Department of Animal Sciences and Industry Kansas State University*, pp. 465-477.
Anon, 1994, "Snacks Shape Up", *Food Review*, 21 (4), pp. 19, 21-22.
Dr. L.D. Satterlee et al., 1973, "Hay! The Future's High Protein Snack", *Snack Food*, 62(4), pp. 46-47.
Dean Southworth et al., May 1970, "Smoothes Snack-Coating", *Food Engineering*, 42(5), pp. 82-83.

(Continued)

*Primary Examiner* — Humera Sheikh
*Assistant Examiner* — Subbalakshmi Prakash
(74) *Attorney, Agent, or Firm* — Everett G. Diederiks, Jr.; Gregory P. Kaihoi

(57) ABSTRACT

Coated snack products are provided whose coating are reminiscent of high fat compound fat coating, resistant to rub-off of a powdery or fat based topping as well as methods for preparing such coated snack products. The present invention provides methods for preparing such coated food product including providing a hot (about 60-85° C.), oil-in-water emulsion coating slurry containing a hydrated film forming hydrophilic colloid. The slurry comprises about 5%-30% of the emulsion of flavor solids in powder form. The methods include applying the hot emulsion to a food base to provide a wet emulsion coated food base. The methods include drying the wet slurry emulsion coated food product to a moisture content of about 1-4% at a temperature of less than the sugar melting point to provide a finished dried food product having non-powdered coating.

15 Claims, No Drawings

(56) References Cited

U.S. PATENT DOCUMENTS

| | | |
|---|---|---|
| 2004/0166206 A1 | 8/2004 | Archibald et al. |
| 2004/0197441 A1 | 10/2004 | Teoh |
| 2005/0037129 A1 | 2/2005 | Newkirk |
| 2005/0042341 A1 | 2/2005 | Thomas et al. |
| 2005/0255217 A1 | 11/2005 | Hudson et al. |
| 2005/0255218 A1 | 11/2005 | Green et al. |
| 2005/0260308 A1* | 11/2005 | Engels et al. ........... 426/302 |
| 2006/0083842 A1 | 4/2006 | Miller |
| 2006/0088648 A1 | 4/2006 | Teoh et al. |
| 2006/0110493 A1 | 5/2006 | Schnieber et al. |
| 2006/0134285 A1 | 6/2006 | Schnieber et al. |
| 2006/0141099 A1 | 6/2006 | Hudson et al. |
| 2006/0177545 A1* | 8/2006 | Haynes et al. ........... 426/103 |
| 2006/0193963 A1 | 8/2006 | Harrington |
| 2006/0204614 A1 | 9/2006 | Rapp et al. |
| 2007/0003680 A1 | 1/2007 | Tachdjian et al. |
| 2007/0065557 A1 | 3/2007 | Pandey et al. |
| 2007/0077344 A1 | 4/2007 | Copado |
| 2007/0243293 A1 | 10/2007 | Janssen et al. |
| 2007/0269553 A1 | 11/2007 | Le et al. |
| 2007/0275128 A1 | 11/2007 | Casper et al. |
| 2007/0292542 A1 | 12/2007 | Astrup et al. |
| 2008/0015652 A1 | 1/2008 | Maile et al. |
| 2008/0032006 A1 | 2/2008 | Villagran et al. |
| 2008/0050474 A1 | 2/2008 | Roskam et al. |
| 2008/0057158 A1 | 3/2008 | Catani et al. |
| 2008/0085354 A1 | 4/2008 | Paeschke et al. |
| 2008/0089978 A1 | 4/2008 | Grigg et al. |
| 2008/0193606 A1 | 8/2008 | Fritzsching et al. |
| 2008/0317907 A1 | 12/2008 | Thomas et al. |
| 2009/0136641 A1 | 5/2009 | Azam et al. |

FOREIGN PATENT DOCUMENTS

| | | |
|---|---|---|
| EP | 316145 B1 | 5/1989 |
| EP | 0506793 B1 | 12/1989 |
| EP | 0547551 A1 | 6/1993 |
| EP | 0547551 B1 | 6/1993 |
| EP | 0714608 A1 | 6/1996 |
| EP | 0808580 A2 | 11/1997 |
| EP | 0861603 B1 | 9/1998 |
| EP | 0971599 B1 | 1/2000 |
| EP | 1043940 B1 | 10/2000 |
| EP | 1402785 A1 | 3/2004 |
| EP | 1402786 A1 | 3/2004 |
| EP | 1402787 A1 | 3/2004 |
| EP | 1579771 A1 | 9/2005 |
| EP | 1424011 B1 | 3/2006 |
| EP | 1935254 A1 | 6/2008 |
| ES | 2278536 A1 | 7/2007 |
| FR | 2875104 A1 | 3/2006 |
| GB | 2012722 | 8/1991 |
| GB | 2335133 A | 9/1999 |
| GB | 2359478 A | 8/2001 |
| GB | 2364503 A | 1/2002 |
| JP | 1997021070 B | 6/1977 |
| JP | 3195450 A | 8/1991 |
| JP | 4267844 A | 9/1992 |
| JP | 2002315525 B | 10/2002 |
| KR | 2005054301 A | 6/2005 |
| WO | WO 93/19629 A1 | 10/1993 |
| WO | WO 95/20326 A1 | 8/1995 |
| WO | WO 95/20328 A1 | 8/1995 |
| WO | WO 96/34538 A1 | 11/1996 |
| WO | WO 98/15188 A1 | 4/1998 |
| WO | WO 98/53712 A1 | 12/1998 |
| WO | WO 01/05256 A1 | 1/2001 |
| WO | WO 01/50873 A1 | 7/2001 |
| WO | WO 01/62105 A1 | 8/2001 |
| WO | WO 01/62106 A1 | 8/2001 |
| WO | WO 02/28201 A1 | 4/2002 |
| WO | WO 02/39861 A1 | 5/2002 |
| WO | WO 02/082915 A1 | 10/2002 |
| WO | WO 2004/008883 A1 | 1/2004 |
| WO | WO 2004/016103 A1 | 2/2004 |
| WO | WO 2004/016116 A1 | 2/2004 |
| WO | WO 2005/107777 A1 | 11/2005 |
| WO | WO 2005110093 A1 | 11/2005 |
| WO | WO 2006/052662 A2 | 5/2006 |
| WO | WO 2006/121985 A1 | 11/2006 |
| WO | WO 2006/138512 A2 | 12/2006 |
| WO | WO 2008/015652 A2 | 2/2008 |
| WO | WO 2008/030828 A1 | 3/2008 |
| WO | WO 2008/151062 A1 | 12/2008 |

OTHER PUBLICATIONS

P. Ratanatriwong et al., 2003, "Sensory Preference, Coating Evenness, Dustiness, and Transfer Efficiency of Electrostatically Coated Potato Chips", *Journal of Food Science*, vol. 68, Nr. 4, pp. 1542-1547.
George Earle et al., Dec. 1996, "Snack Topping Tactics", *Baking and Snack*, pp. 30-34.
L.H. Mckee, 2001, "Evaluation of the Physical and Sensory Properties of Chile-Flavored, Puffed, Extruded Products Made From Meat and Potato Flour", *Journal of Muscle Foods*, 12, pp. 153-166.
Ernest Mann, Oct. 2000, "Cheese Product Innovations", *Dairy Industries International*, pp. 17-18.
Paula Frank, Sep. 2000, "Snack Mixes", *Food Products Design*, pp. 87-88, 91, 93-94, 96-102.
Cal Andres, Dec. 1981, "Food Color Dispersions Furnish Higher Quality Colored Foods While Improving Operating Efficiencies", *Food Processing*, pp. 52-53.
R. Chandan, 1997, "Snack Foods, Meats, and Other Applications", Chapter 8, pp. 89-101.
Dean Duxbury, Jun. 1991, "'Light' Seasonings Reduced Fat", *Food Processing*, p. 104.
Anon, Jul. 2000, "Snack Foods", *Japanscan: Food Industry Bulletin*, 18(5), p. 7.
T. Mary, Mar. 1998, "Cheese Flavored Snacks Buyer's Guide", *Gourmet News*, vol. 63, No. 3, pp. 32-34.
Jul. 1985, "Coated Fruit Snack", *Snack Food*, 74(7), p. 16.
Dr. Rulon Chappell, Oct. 1977, "Cheese Flavors for Snack Coatings" *Snack Food*, p. 27.

\* cited by examiner

COATED FOOD PRODUCT AND METHOD OF PREPARATION

CROSS-REFERENCES TO RELATED APPLICATIONS

The present invention relates to coated snack food products and to their methods of preparation. More particularly, the present invention relates to methods for preparing coated food products with the use of a novel film forming oil and water emulsion.

BACKGROUND OF THE INVENTION

A wide variety of food products comprise a base food or comestible having a topical coating to improve the taste, appearance, nutrition, texture, stability, improved shelf-life or other feature of the product. In particular, a wide variety of snack food products comprise a base food such as a fried expanded piece fabricated from a cooked cereal dough and having a seasoning coating. In particular, a wide variety of such snack products comprise a topical coating comprising an ingredient in particulate form, e.g., cheese powder. In other variations, a powder seasoning can be combined with a compound fat to provide a seasoned topical coating (sometimes referred to as a compound coating) to a snack food product base.

One problem long associated with many varieties of snack foods is the tendency of topically applied substances, such as seasonings and decorations (often referred to as "toppings" herein), to become separated from the base portion of the food product. Such separation can occur, for example, during the preparation, packaging or transit of the food item. Separation during preparation or packaging can result in increased production costs due to higher seasoning overuse and can complicate processing. Separation during packaging, or transit can result in loose toppings becoming collected at the bottom of the package, while the product reaching the consumer has less than the desired complement of topping thereon. (See, for example, U.S. Pat. No. 4,910,031 Topped Savory Snack Product issued Mar. 20, 1990).

A further type of undesirable separation of topping from snack food items occurs when the product is eaten. Frequently, the topping adheres to the fingers of the consumer. This phenomenon is referred to as "rub-off" or "fingerprinting" both by the industry and in the present application. Rub-off of toppings from any snack food item is undesirable because, again, the product reaching the mouth of the consumer includes a reduced amount of the toppings. Rub-off of toppings, especially powdery or oil or fat-based toppings, is undesirable as it can leave a residue upon the fingers of the consumer. Accordingly, the need exists for reducing all types of topping separation from snack food items prior to being consumed. A particular need exists for reducing the rub-off of powdery or oil and fat-based toppings onto the hands of consumers.

The present invention is directed to improvements in coated snack food items especially (but not exclusively) savory. The term "savory" is used herein as it is used in the industry to denote snack food items having a non-sweet dominant flavor. Many savory snack foods have saltiness and/or cheesiness as dominant flavors. Examples of savory snack foods include potato chips, pretzels, cheese puffs, corn chips, tortilla chips, crackers and the like. The dominant flavors of these snack foods sharply contrast with the sweet dominant flavors of non-savory snacks such as cookies, doughnuts and candies.

Savory snack food items frequently comprise a "base" food product portion and one or more toppings. Examples of snack food base portions include vegetable slices (e.g. fried potato slices of topped or seasoned potato chips), cooked dough pieces (e.g. of topped crackers or pretzels), and puffed food products (e.g. the extruded puffed corn collet of cheese-flavored puffs). Examples of common toppings include coarse and fine ground salt, pepper, seasoning powders such as garlic powder and onion powder, and fat and oil-based toppings such as cheese powders and granules.

U.S. Pat. No. 4,910,031 "Topped Savory Snack Foods" (issued Mar. 20, 1990 to Budd et al.) describe non-sweet sugar based binder compositions importantly including an anti-sweetness ingredient to address these problems. However, such sugar binder coating approaches can suffer from texture and/or appearance deficiencies. However, the '031 patent does not teach or suggest a dry step and the seasoning carrier was a sugar slurry, not an emulsion, which yields significantly different textural and visual properties.

According to the present invention, novel, seasoning bearing (in particulate form), film forming oil-in-water emulsion coating slurries are employed to improve the coating stability of base portions of snack food items. This coating protects against both rub off and melting and provides a unique visual and textural appeal. The present coating compositions are desirably free of any anti-sweetness ingredients. The present coating slurry compositions and methods of preparation provide other multiple surprising benefits as is described in detail below.

BRIEF SUMMARY OF THE INVENTION

In its method aspect, the present invention resides in methods for preparing a coated food product resistant to rub-off of a powdery or fat based topping. The methods include a first step of providing a hot, oil-in-water emulsion coating slurry containing a hydrated film forming hydrophilic colloid. The slurry comprises about 15% to 35% of the slurry of an oil phase and 10-35% of the slurry of a water phase. The slurry further comprises about 0.2% to 0.8% of the slurry of an emulsifier. The slurry comprises about 15% to 35% of the slurry of a sugar which has a low hygroscopicity and a melting point temperature ranging from about 100 to 180° C. The slurry comprises about 5% to 30% of the emulsion of flavor solids in powder form. The slurry emulsion is heated to a temperature of about 60 to 85° C.

The methods include a step of applying the hot emulsion to a food base to provide a wet emulsion coated food base in a weight ratio of emulsion to food base ranging from about 1:10 to about 3:2.

The methods include a step of drying the wet slurry emulsion coated food product to a moisture content of about 1-4% at a temperature less than 120° C. to limit Mallaird Browning and provide the desired texture, flavor, and appearance of the finished product.

DETAILED DESCRIPTION OF THE INVENTION

Broadly, the present methods include a first step of preparing or providing a particular hot oil-in-water emulsion coating slurry of flavor solids (or coating slurry make-up step herein); applying the coating slurry to a food base to form a slurry coated food base; and, drying the slurry coated food base at low temperatures to provide a coated and dried food product. Each of these method-of-preparation steps as well as end-product properties, and uses are described in detail below.

Throughout the specification and claims, percentages are by weight and temperatures in degrees Centigrade unless otherwise indicated. Each of the referenced patents is incorporated herein by reference.

In the preferred embodiment, the present methods can comprise a first step A of preparing or providing a particular hot emulsion coating slurry of flavor solids.

Step A can comprise of one or more sub-steps. The hot emulsion slurry provision or coating slurry make-up step can include a sub-step of providing a hot concentrated sugar syrup that comprises low hygroscopic sugars and further includes a particular hydrated film forming hydrophilic colloids blend. The sugar syrup bearing hydrated hydrocolloids can be practiced by combining one or more low hygroscopic sugars with hot water (e.g., 60-85° C.) sugars therein to dissolve the sugars and admixing to form a sugar syrup with the particular hydrophilic colloid blend to hydrate the hydrophilic colloids. Good results are obtained when the moisture content of the sugar syrup ranges from about 20%-40%, preferably 25%-35% and for best results about 30%.

In a preferred variation, the hydrocolloids are pre-blended with the dry sugar(s) ingredient and added to the 60-85° C. water. This aides in the dispersion of the gums and prevents dispersion issues that arose while testing various kettle/mixer configurations Sugars Description A wide variety of simple and/or complex carbohydrates with low to medium hygroscopicity values possessing a degree of sweetness (hereinafter "sugars") can be used in the emulsion slurry composition. These include, by way of illustration and not limitation, mono and polysaccharides having a degree of polymerization ($D_p$) up to about 10. Sugars can be of natural or synthetic origin and can comprise naturally occurring or man-made mixtures of sugars. Preferred sugars are sucrose, lactose, trehalose, maltodextrins, isomalt, maltitol, and fructose syrups. For savory coatings, a low sweetness sugar composition should be used. Blends of maltitol and lactose and maltitol and maltodextrin are especially preferred. The proportion of sugar(s) in the emulsion slurry should be high enough so as to function effectively to bind together the topping and the base, provide bulk, and to effectively reduce topping rub-off. Using a high percentage of sugar in the emulsion slurry keeps water activity low and helps prevent water migration into the snack food base, preventing undesired structure and texture changes prior to drying. Certain blends of sugars can lead to undesirable brittle films after drying, and this can be mitigated by adding glycerin to the slurry in amounts of 1-4%.

Useful herein in whole or in part for the sugar ingredient as low hygroscopic sugars are those having a melting point of 100-180° C., preferably 155° C. or less. In one embodiment, preferred useful sugar alcohols are those glaze forming selected from the group consisting of isomalt, maltitol, sorbitol, and lactitol and mixtures thereof. Preferred for use herein is maltitol due to the factors mentioned above and also the high laxation threshold and lower cost.

Polydextrose provided the desired finished product in terms of texture and appearance, but it is very hygroscopic, and therefore picked up too much moisture causing it to become sticky. In one variation, the present coating compositions comprise low levels (i.e., 0.5% or less than of the coating) of polydextrose or are free of polydextrose.

Gum Description

Useful hydrophilic colloids or gums herein are film forming ingredients. The present emulsiogums as to provide the emulsion with viscosities ranging from about 800 to 2500 centipoises (at application temperatures). Such viscosities provide desirable fluid properties to provide an even coating on the food base pieces and to conveniently provide the finished coated pieces with appropriate coating thicknesses. Good results are obtained when the emulsion includes about 0.05-1% of such hydrated gums. Better results in terms of desired processing viscosities and finished product appearance (coverage) are obtained employing gum levels in the emulsion ranging from about 0.1-0.5% and for best results about 0.2-0.3%.

Representative examples of hydrocolloids include agar, alginate, carrageenan, carboxymethylcellulose, cellulose, cyclodextrins (in the presence of fat or other hydrophobic ligand), gelatin, guar gum, gum arabic, and hydroxypropylmethylcellulose (HPMC), locust bean gum, methyl cellulose, xantham gum, tara gum and mixtures thereof. Preferred examples of hydrocolloids include gum arabic, guar, agar, carrageenan, locust bean gum, and mixtures thereof.

Also useful herein are film forming starches. Film forming starches are well known and the skilled artisan will have no difficulty in selecting useful film forming starches for use herein. Generally, such useful film forming starch will contain more amylopectin than amylose. The amylopectin being a highly-branched chain glucose polymer provides the desired film forming.

The present hot emulsion slurry providing step can also include a sub-step of admixing a heated solid fat ingredient in heated liquid form to the sugar syrup containing hydrated gums to form a hot emulsion.

The present emulsion slurry can also comprise from about 10% to about 40% of the slurry on a wet basis of an edible solid fat or shortening ingredient. Maintenance of shortening concentrations within the limits of about 10% to about 40% is important for providing snack products of acceptable textural quality. Better results in terms of having a balanced texture and appearance can be obtained when the emulsion comprises about 20% to about 30% edible solid fat or shortening. A shortening component adds richness to the eating properties of the finished snack products. Also, employing a solid fat or shortening is preferred since using such solid fat provides superior flavor and mouth feel benefits. The present coated snack food products provide the benefit of a definite flavor pop from this coating as compared to dry seasoning or compound coating. The particular fat constituent level will depend particularly upon the desired type of finished snack product and its properties. In, for example, a snack fried product the shortening gives the coated snack products the desired melt profile in comparison to coated snack products containing no shortening in the coating.

It will be appreciated that these added fat component levels are in addition to any fat level contribution such as the minor amount of added fat contributed by the seasoning component of the coating (e.g., the fat component of a dried cheese seasoning ingredient).

Conventional shortening materials are suitable for use as the shortening ingredient of the present emulsions. In one variation, the shortening materials are solid at room temperatures to minimize the rubbing or oiling off of the coated finished product. Such conventional shortening materials are well known in the art. The conventional shortenings useful herein are fatty glyceridic materials that can be classified on the basis of their physical state at room temperature. Liquid shortenings or oils can be used and provide the advantage of ease of incorporation and are usually more economical. However, employing such liquid oils can increase undesirable rub-off of the coating upon consumption of the finished snack product, and may result in off-flavors due to lipid oxidation and, therefore, a shorter shelf life. Employing low levels of liquid oils together with a solid shortening ingredient can also be practiced to balance the advantages and disadvantages of liquid oils. Solid shortening at room temperature can also be used and provides the advantage of desirable mouth feel upon consumption and also stabilize the emulsion.

The liquid shortening can be animal, vegetable or synthetic oil (e.g., sucrose polyesters) that is liquid at ordinary room temperatures. Liquid oils not preferred since can oil out of the coating on the finished product.

In preferred variations, the fat ingredient is solid to semi solid at room temperature (i.e. 20° C.). Particularly useful herein is coconut oil as the solid fat ingredient. Coconut oil is particularly desirable since such ingredients are solid at room temperature without need for hardening such as by hydrogenation that can lead to undesirable trans fatty acids upon hydrogenation and thus are naturally low in trans fats. Less preferred, but nonetheless useful herein, are a wide variety of fat ingredients that are solid at room temperature prepared from conventional fat sources by hydrogenation such as from oils of palm, soybean, canola, cottonseed, corn, safflower. Palm stearin can also be added to further increase heat stability (i.e., melting point).

When a solid or semi-solid shortening ingredient is employed, e.g., coconut oil, the fat ingredient is conveniently heated to above its melting point to form a liquid fat. Emulsifiers can then be added to the heated liquid fat, which can then be admixed with the sugar solution containing the hydrated gums. In practice, the fat can be heated to about approximately 75° C. for admixture to the sugar syrup, thus preventing a temperature drop in the mixing kettle.

Emulsifiers

An emulsifying agent in the emulsion composition can be used and the present coating compositions can comprise, to reduce the lipophobic tendencies of the aqueous sugar solution as well as to combine both the fat, sugar syrup and flavoring solids ingredients into a smooth uniform coating layer that adheres well to the food base pieces surface especially when the coating emulsion composition comprises such flavor ingredients such as cheese powder. The emulsifying agent also improves the flow of the coating emulsion composition.

Useful are emulsifiers that are compatible with the fat used for frying the snack base to prevent fat migration between the coating and snack base.

The present emulsion slurry coatings can comprise about 0.2% to about 0.8% of emulsifier(s), preferably about 0.4% to about 0.6%. In preferred form, the emulsifier ingredient(s) is selected to provide an oil-in-water type of emulsion. In an exemplary embodiment, the present emulsion coatings comprises about 0.05% to about 0.4% on a dry weight basis of emulsifier(s). The shortening provides a convenient carrier for addition of emulsifiers to the emulsion coatings. Thus, all or a part of the emulsifier can be pre-mixed with the fat or shortening ingredient. In other variations, all or a portion of the emulsifier can be added to the emulsions separately from the shortening. The emulsifier is also useful to maintain the emulsion integrity of the emulsion coatings through the drying steps and over extended room temperature storage.

All or a portion of the emulsifier(s) component can be admixed with the shortening component. The emulsifier typically comprises from about 1% to about 10% of the shortening component, preferably from about 1 to 5% and, most preferably from about 1% to about 3%.

Emulsifiers can be pre-hydrated in an aqueous dispersion and added to the emulsion coatings. They can also be part of an emulsion or dispersion with or without fat component. In this system we found that adding the emulsifiers to the oil phase greatly helps dispersion into the coating system. We chose lecithin as our primary emulsifier due to its high surface activity and ability to prevent phase separation of our hot emulsion over time. We also added blends of mono and diglycerides to strengthen the emulsion stability, improve mouthfeel, aid in controlling fat crystal size, and help control viscosity. The hot emulsion slurry provision step can also include a step of admixing the heated liquid fat, emulsifiers and the sugar syrup to form an emulsion. In one preferred variation, this emulsion formation can be practiced by admixing the heated oil with the emulsifiers and the hot sugar syrup with high shear agitation or with vigorous agitation. Good results are obtained when the admixing sub-step is practiced at temperatures ranging from about 60-85° C.

Seasoning Addition

The hot emulsion slurry provision step can also include a step of admixing flavor solids to the hot emulsion to form the hot emulsion slurry. The flavor solids can comprise any of a number of common savory snack food toppings and seasoning blends such as sour cream, ranch, cheese, onion, garlic, yeast extract and barbecue flavored powders and/or granules and mixtures. In another preferred variation, the present emulsion slurry comprises cheese powder and/or granules (large particulates) to snack foods. The emulsion slurry can comprise about 10-40% flavor solids. When cheese powder is the principle flavor solids, better results can be obtained when the flavor solids comprise about 18%-32% and for best results about 25-30% flavor solids. Of course, the cheese powders can comprise blends of various cheese flavors and types, e.g., Cheddar, Romano, Parmesan cheese with added salt and other flavors. In certain variations, especially when the coating emulsion slurry includes cheese powder as a component of the flavor solids, at least a portion of the flavor solids is dried cheese powder having a particle size of about 1 mm less, and more preferably less than 1% retained on a US standard size screen ($\approx \leq 850$ microns).

If desired, the emulsion can additionally comprise a wide variety of adjuvant materials intended to improve the appearance, texture, flavor and/or nutritional properties of the finished coated food products. Depending on the composition of the seasoning blend, it may be required to add protein to the emulsion for functionality purposes such as aiding in emulsification and stability, providing the desired texture, and forming the desired film consistency, thickness, appearance, and to avoiding blistering. It was found that whey protein and soy protein worked best in this application. Other adjuvant ingredients can include, for example, sugar(s), minerals, vitamins, colorants, preservatives and flavors. If present, each of these constituents can comprise from about 0.01 to about 2% (or more for sugar, cheese solids) by weight of the slurry. The flavors can be either in liquid, fat soluble forms and/or in dry powder forms such as a liquid oil absorbed onto a particulate carrier, e.g., gum arabic, starch, silicon dioxide, or dehydrated cheese solids. While the present invention finds particular suitability for use in connection with the provision of savory (i.e., non-sweet) seasoning topical coatings, if desired, the present coating coatings can including various sweeteners including nutritive carbohydrate sweeteners as well as high potency sweeteners whether natural (e.g., stevia) or synthetic (sucralose, aspartame, saccharine) and mixtures of the aforementioned sweeteners.

These adjuvant materials can include vitamin and/or mineral fortification, colors, flavors, high potency sweetener(s), nutriceuticals, botanicals, micronutrients and mixtures thereof. The precise ingredient concentration will vary depending on the desired finished product. Generally, however, such materials can each comprise about 0.01% to about 2% dry weight of the snack base composition.

One especially useful material is common salt. Desirably, the salt comprises about 0.1 to 4%, preferably about 0.5 to 3% of the finished product.

Macronutrients and micronutrients may be provided during the manufacturing process to add essential vitamins and minerals to the product to create a well balanced, nutritionally complete meal.

In preferred variations, the flavor solids are added to the hot emulsion while maintaining agitation and temperature to provide the hot emulsion slurry.

The slurry's consistency upon application to the food base is important to providing a consistent, evenly spread coating to the food base. Good results are obtained when the emulsion slurry is not too runny nor too thick to apply to form a thin coating on the food base pieces. Good results are obtained, when, for example, the viscosity of the hot emulsion slurry ranges between about 600 to 2500 cps with a preferred range of 1000-1500 cps. Preferred methods of application include panning, drizzling, and spraying, with spraying being the most preferred.

The skilled artisan will appreciate the difference between the present topical emulsion coatings and known fat-based coatings, sometimes referred to as compound coating. Such compound coatings often comprise particulate solids dispersed in a water and oil emulsion. Total fat content can vary e.g. from 10 to 70% by weight. These fat based compound coating based toppings are often "tacky" to the touch and are easily rubbed off onto the hand of the consumer. These compound fat coatings also melt during storage/shipping if temperatures are above ambient resulting in product blocking in the bag.

Applying Emulsion

The present methods can comprise a step of applying the hot emulsion to a quantity of food base pieces to provide a wet emulsion coated food base.

Base Pieces

The base food piece can be any of the typical snack food base pieces or any other product of a similar nature. It can be in the form of a chip, a tube, a ball, a curl or any of the other familiar snack forms. While generally the base food piece is cereal or farinaceous in nature such as corn, wheat, rice, barley and the like, the present invention is not limited thereto but includes any similar base food piece derived from protein, starch, fiber or combinations thereof, with or without fat and other ingredients. Many of these base pieces are made by forming a dough, either cooked or uncooked, and shaping the dough and finally toasting, baking or deep fat frying the piece to provide the finished product. In preferred variations, the base piece is a puffed or expanded piece fabricated from a cooked cereal dough by deep fat frying. However, the base pieces can also be supplied by a wide variety of breakfast cereal pieces such as those in the form of flake, shreds, and biscuits and puffed pieces of various shapes and sizes, e.g., spheres, rings, letters, and/or figurines. The base pieces are preferably plain or uncoated. However, in less preferred variations, cereal based pieces having a pre-sweetener coating or vitamin slurry can also be employed.

The base piece can be rather bland in flavor or can be highly flavored by reason of one or more flavoring materials included into the cooked cereal dough from which the snack pieces can be fabricated.

In still other preferred variations, the base can be provided by cooked cereal dough pieces typically shaped and sized for snacks especially corn based pieces such as the cornucopia shaped pieces described in U.S. design 202,609 "Puffed Snack Food Product (issued Oct. 26, 1965 to Weis et al.; (or the shapes described in USD 339,443; USD 339,444; USD 341,469; USD 368,791; USD 372,352; USD 373,671; USD 384,785; or USD 403,485) or that puffed triangular pillow design described in U.K. Design No 2012722 "Snack Food Product" registered 2 Aug. 1991 to General Mills, Inc. In still other variations, the base pieces can be flat or planar and having a variety of peripheral shapes, e.g., triangles, disks, scoops, curled strips or ribbons.

In preferred variations, the food base pieces are low moisture (e.g. 1-4% moisture) pieces having cooked and puffed or expanded by deep fat frying. In certain variations, all or portions of the pieces can be fabricated from cooked cereal dough comprising whole grains especially whole grain corn (maize). In preferred variations, the base pieces themselves are low in sugar content preferably under 15% by weight of the base of sugar(s), more preferably less than 10% total sugars in the base and for best results less than 5% sugars.

Mixtures of various base pieces are contemplated. For example, a mixture of two or more base flavors and/or shapes or sizes. Also, the food base can include other pieces such as nuts or nut pieces. In still other variations, the base can include pretzel shapes, rye chips, or baked bread slices.

The size of the uncoated base can range from about 75 to 125 pieces per 10 grams to larger sized snack food pieces ranging from about 1-20 pieces per 10 grams.

The present method of preparation can comprise the step of coating or enrobing base pieces with the present hot emulsion slurry coating composition. In a preferred embodiment, the coating is applied in the form of a hot slurry said containing 10 to 35% by weight water and 65 to 90% by weight solids The slurry in preferred form is provided at a moisture content more preferably ranging from about 15%-25% moisture. At such concentrations, the slurry exhibits a thick viscous property at room temperature.

In preferred variations, the emulsion slurry is made-up fresh and applied at preferred make-up temperatures, e.g., 60-85° C. However, in other variations, the emulsion slurry can be made up previously and allowed to cool to room temperature. The emulsion slurry can then be heated prior to applying it to the snack to reduce its viscosity. Preferably, the emulsion slurry composition is heated to a temperature between 60-85° C., preferably about 65-75° C. to reduce viscosity to a level which facilitates mixing, pumping and application. The emulsion slurry can be applied to the snack food by conventional means such as spraying or drizzling the emulsion slurry onto the snack food. The emulsion slurry can be applied to all or a portion of the surface of the food base pieces and excellent coverage is achieved through the use of a standard tumbler.

The total amount of emulsion slurry to be employed depends upon the composition and texture of the toppings and the base portion. Those skilled in the art will optimize the amount of emulsion slurry employed so that the minimum amount needed to obtain the desired appearance and textural properties. Proper control of the film thickness can be achieved by adjustment of the viscosity and temperature of the emulsion and the contact time. However, good results are obtained when the ratio (wet basis) of emulsion slurry to in a weight ratio of emulsion to food base ranging from about 1:10 to about 2:1. Better results in terms of appearance, eating quality and consumer preference can be obtained when the ratio of emulsion slurry coating is more evenly balanced such as in a ratio of about 2:3 to about 3 to 2 and for best results about 1:1.

With certain snack foods, such as cheese puffs, it can be desirable to tumble or agitate the snack food base pieces during emulsion slurry application or coating to provide an even coating. Any conventional enrobing apparatus and technique can be used to practice the present enrobing or application step. Generally, a useful technique involves tumbling. The comestible piece(s) and emulsion slurry are added to a rotating drum and tumbled to achieve an even distribution of the emulsion slurry on the comestible. Preferably, the emulsion is added after the comestible has been added to the drum. Another useful technique is simply spraying the emulsion over those comestibles, which are desirably not tumbled due to the shape, frangibility, etc., or if it is only desired to coat one side of the comestibles.

In another variation, particulate matter can be added to the tumbler for adhering the particulate matter to the external surface of the emulsion coated base pieces. This particulate matter is in addition to the flavoring solids added to the emulsion slurry. Particulate matter can be 0.5-4 mm, preferably about 0.5 to 2 mm, and can include fruit pieces, granola, seeds, candy bits, flavor bits, nuts, Bacos® brand flavored bacon flavored soy protein bits and mixtures thereof. The particulate material upon finish drying of base pieces adheres to the external surface due to the coating action of the hot slurry emulsion. Particulate matter can be added in a weight ratio of particulate matter to cereal base ranging from about 1:100 to about 25:100, preferably about 5:100 to about 15:100.

Drying

The present methods can comprise a step of drying the wet slurry emulsion coated food product to a moisture content of about 1-4%.

In preferred form, the coated comestible products of the present invention are in the form of a free flowing or separable or only loosely aggregated mixture of individually coated pieces typically of coated snack-pieces. In preferred form, the entire piece is coated with the present coating. In certain variations, however, such as biscuits, taco shells, or crackers, only one surface such as on of two major oppose planar surfaces can be provided with the coating although preferably the entire surface is coated.

Desirably, the coated dried snack base pieces are at moisture contents ranging from about 1% to 4% to provide shelf stable storage. The coated snack food item is dried following application of the aqueous emulsion slurry composition to remove excess moisture which could otherwise adversely affect the texture, appearance and/or shelf life of the product. Preferably, a final moisture content of 2-3% is desired. Drying times and temperature will vary based upon the type(s) and amount(s) of sugar(s) and amount of water present in the emulsion slurry as well as the presence of any whey protein constituents. For example, higher DE sugars can be harder to dry, as a general rule. Reducing sugars and those coating comprising whey protein constituents are prone to brown and thus require the use of generally lower drying temperatures. Temperatures for drying the emulsion slurry in a forced air oven are 80° C. to 125° C., preferably 104° C. to 110° C. Product blocking in the dryer is greatly reduced if pickers are employed to disturb or agitate the product while on the dryer belt or utilizing a dryer with multiple passes to disturb or agitate the product. For example, in a three pass dryer, the product drops from the topmost or highest belt by gravity onto the underlying middle belt. At the end of the run of the middle belt, the partially dried product then falls by gravity onto the third belt or underlying or lowest belt. Such gravity falling from belt to belt imparts agitation to the product leading desirably to piece segregation or de-lumping. In preferred form, there will be a product turn when the product moisture is 3.5-4%. Also, having a cooling zone at the end of the dryer greatly reduces any clumping or stickiness issues with the coated finished product. After drying, the improved snack food is allowed to cool prior to packaging.

The finished product is an improved snack food item including a smooth homogeneous continuous thin, non-sticky emulsion slurry topical film that advantageously reduces separation of powdery and particulate toppings, such as seasonings, decorations and the like. When applied as a coating over fatty or oily items such as fried snack food base pieces, transfer of fat or oil from the base piece to the hands of the consumer can be reduced. The present coating is reminiscent of high fat compound fat coating resistant to rub-off of a powdery or fat based topping, as well as method for preparing such coated snack products. Unlike other products (e.g. hard fat coatings), the emulsion slurry dissolves rapidly and dissipates rapidly in the mouth for improved flavors release from the toppings, but yet does not melt during shipments where temperature is <43 C.

It is an advantage of the present invention that since the present coating compositions form glassy non sticky coatings at room temperature, particulate materials needed to make a sticky coating non tacky such as are described as essential in the '984 patent to Gilberson can be and preferably are not included as part of the coating.

The finished product is characterized by an evenly thin (i.e., about 20 to 40 microns in thickness (10-100 μm) coating. The coatings are reasonably uniform in thickness (e.g., ∓50% average thickness). The coatings are homogenous rather than heterogeneous and continuous rather than spotted or discontinuous.

After finish drying, the coated pieces are allowed to cool to ambient temperature and then subsequently packaged and distributed in conventional manner. In preferred variations, due to the hygroscopicity of the coating, the dried finished coated pieces are maintained in low relative humidity conditions (relative humidity of less than 40%) prior to packaging in moisture barrier packaging.

The products can be conventionally packaged such as in pouches or bags (for larger serving portions or multiple servings) fabricated from flexible packaging films. In certain variations, the pouch or bag can be disposed within an outer carton for greater product protections for distribution and sale.

The inventive compositions and methods find particular utility for use in connection with snack food items as these items often include toppings that are prone to separation or rub-off, especially fat-based toppings such as cheese powders, and are generally eaten out of the hands. Examples of savory snack food items which can be improved via the present invention include crackers, corn chips, potato chips, tortilla chips, corn puffs, especially the cornucopia shaped pieces fabricated from puffed corn based cooked cereal doughs, and the like, as well as reduced calorie and/or reduced fat snack food equivalents of the same.

In still other variations, the topping can be applied to dried potato slices as the sauce/seasoning component. Dry mixes for such food items as scalloped or au gratin potatoes or add-meat dinner kits generally include a first pouch for dried potato slices or other shaped pieces and a second dry mix blend in a second pouch intended to be combined with liquid ingredients and cooked to form a sauce. In this variation, the coating can be formulated to coat all or a portion of the potato slices and when cooked with liquids (e.g., water and/or milk) dissolve off the slices to form the coating sauce (e.g., creamy cheese sauce). In this variation, a single pouch or bag can be provides thereby eliminating the need for a second pouch and the need for a separated container (e.g., a carton) to house both the dried potatoes pouch and the seasoning sauce dry blend of ingredients). Eliminating both a second pouch and the additional carton container can lead to lower costs and reduction in packaging waste. Also, greater consumer convenience can be provided by a single pouch than a multi pouch product delivery arrangement.

The snack food item preferably is cooked prior to application of the present emulsion slurry, although application of the emulsion slurry to a partially cooked dough item or vegetable slice is useful as long as further cooking does not destroy of any of the toppings.

The high sugar content of the present emulsion slurry compositions imparts many beneficial qualities to the improved snack food items. Some sugars, because of their humectancy, enhance the improved snack food's tolerance for moisture and thus prolong the shelf life of the product. Because of its inherent physiochemical properties, sugar also adds structure which can provide texture and mouthfeel benefits and to provide appearance benefits such as a sheen or gloss to the product surface.

Still another benefit of the present coatings is that the coatings are less expensive than a fat based coating. The present sugar based coatings are less susceptible to melting (which leads to undesirable blocking) when exposed to abusive temperatures during distribution. Also, the coatings reduce the potential for oiling out, fat bloom, and other physical challenges that occur at abusive temperatures.

The present coatings provide higher flavor impact at equivalent flavor solids application rates compared to compound coatings. The present coatings provide improved texture and melt characteristics as well as improved visual appeal. The present coatings can be used to provide both sweet and savory flavored coatings. By providing a protective barrier to the base, the present coatings can extend the shelf life of the base pieces.

In variations, in addition to the finely ground flavor solids, the present coatings can also be used to secure or bind external particulates to snack surface (e.g., Bacos® brand bacon flavored bits).

Advantageously, the non-sweet, sugar-based emulsion slurry dissolves and is perceived to dissipate rapidly in the mouth, thereby allowing the underlying flavors to be sensed rapidly. This rapid dissipation compares favorably to the much slower dissipating methylcellulose (Methocel®) and fat-containing binders. The present emulsion slurry also permits the preparation of reduced-fat-containing snack food items while minimizing the perceived loss of desirable mouthfeel and textural qualities.

Another advantage of the present invention is that applied seasonings are bound to the base snack product pieces. As a consequence, the seasoning is less likely to fall off the snack product base pieces during distribution, storage and consumption.

Still another advantage of the present invention is that the problem of blocking or bridging of coated individual discrete product pieces is reduced as compared to the age old problem of compound coating melting and resetting in the package during distribution leading to blocking or bridging.

Still another advantage of the present invention is that the tendency of fat based coatings to melt and pool in the bottom of the bag, such as is aggravated during storage and distribution under elevated temperatures such as summer distribution, is greatly reduced. The present products provide improvements in the reduction of coating melting during distribution.

Still another advantage is that higher levels of seasoning application can be provided, as compared to typical topical application of seasoning, resulting in a more intense flavor delivery. Such high intensity products are well received as being of a premium quality. Also, improved products can be provided that are designed for an aging consumer population experiencing diminution in taste sensory perception.

Still another advantage of the present coatings is that a high level of cheese coating can be provided without or with reduced levels of sweetness that nonetheless do not exhibit high levels of seasoning loss or stickiness or mess upon hand consumption.

The inventive compositions and methods are not limited to so-called snack food items but do find particular utility therewith as these items (a) often include toppings that are prone to separation or rub-off, especially fat-based toppings such as cheese powders; and (b) are generally eaten out of the hands. Examples of savory snack food items which can be improved via the present invention include crackers corn chips, potato chips, tortilla chips, corn puffs and the like, as well as reduced calorie and/or reduced fat snack food equivalents of the same. The snack food item preferably is cooked prior to application of the present emulsion slurry, although application of the emulsion slurry to a partially cooked dough item or vegetable slice is useful as long as further cooking does not destroy of any of the toppings.

In a preferred variation, the coatings are formulated to be low in sweetness without need for and are preferably free of anti-sweetness ingredients.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method for preparing a coated food product resistant to rub-off of a powdery or fat based topping, comprising the steps of:
   A. providing a hot oil-in-water emulsion coating slurry, said slurry comprising:
      about 15% to 35% of the slurry of an oil phase;
      about 0.2% to 0.8% of the slurry of an emulsifier;
      about 15% to 35% of the slurry of a sugar, wherein the sugar has a low hygroscopicity and a melting point temperature ranging from about 100-180° C.;
      about 0.05% to 1% of a hydrated film forming hydrocolloid; and,
      about 5% to 30% of the emulsion of savory flavor solids in powder form;
      said emulsion having a temperature of about 60 to 85° C. and a viscosity ranging from 600-2500 cps; and,
      about 10%-35% moisture;
   B. applying the hot emulsion to a food base to provide a wet emulsion coated food base in a weight ratio of emulsion to food base ranging from about 1:10 to about 3:2; and, C. drying the wet slurry emulsion coated food product to a moisture content of about 1-4% at a temperature of less than the sugar melting point to provide a finished dried food product having a single, outermost coating layer of a powdery or fat based topping which is resistant to rub-off.

2. The method of claim 1 wherein step A includes the sub-steps of:
   pre-blending the hydrocolloids with the sugar and then adding the combined dry ingredients to water heated to 60-85° C.;
   admixing the oil ingredient and the emulsifiers to the hot sugar syrup having hydrated hydrocolloids with high shear mixing to form an oil-in water, emulsion; and
   admixing the flavor solids in powder form to the oil-in water emulsion to form the hot oil-in-water emulsion coating slurry.

3. The method of claim 2 wherein step B includes the sub-steps of:
   transferring the food base pieces to a rotating drum, tumbling said pieces within said drum, spraying or drizzling the hot emulsion slurry composition upon the tops and bottoms of said tumbling pieces from a plurality of nozzles.

4. The method of claim 3 wherein the drying step is performed with agitation of the coated snack base pieces.

5. The method of claim 4 wherein at least a portion of the sugar is a sugar alcohol for savory non-sweet options.

6. The method of claim 4 wherein the emulsion comprises about 20 to 30% sugars.

7. The method of claim 6 wherein in step B the ratio of emulsion slurry to food base ranges from about 2:3 to about 3:2.

8. The method of claim 7 wherein step C is practiced at a temperature of 110° C. or lower and wherein the admixing of the flavor solids is practiced with high shear.

9. The method of claim 8 wherein the hydrocolloid is a hydrocolloid blend including a combination of gum arabic and guar, agar and locust bean gum; or combinations of agar, locust bean gum, gum Arabic, guar.

10. The method of claim 9 wherein the oil phase comprises shortening ingredients that are solid at room temperature.

11. The method of claim 10 wherein at least a portion of the shortening ingredients is coconut oil.

12. The method of claim 3 wherein at least a portion of the flavor solids is dried cheese powder having a particle size of less than 1% retained on a US standard size screen ≤850 microns.

13. The method of claim 12 wherein the step C additionally comprising a sub-step of:
   separately dispensing a particulate composition upon the tops and bottoms of the pieces as they are tumbled so that said emulsion slurry composition causes said particulate composition to adhere to said top and bottom surfaces without substantial penetration of the emulsion slurry composition into said pieces and without loss of binding or adhesion of said particulate composition to said pieces.

14. The method of claim 1 wherein the flavor solids are selected from the group consisting of sour cream, ranch, cheese, onion, garlic, yeast extract, barbecue and mixtures thereof.

15. The method of claim 1 wherein the emulsifier is lecithin and the hydrocolloid is selected from the group consisting of locust bean gum, agar, gum arabic, guar and mixtures thereof.

* * * * *